United States Patent [19]

Keller

[11] Patent Number: 4,960,521

[45] Date of Patent: Oct. 2, 1990

[54] PROCESS FOR PERFORMING A DIALYSIS OPERATION USING A MAGNETIC WEIGHTED CLAMP

[76] Inventor: Andreas Keller, 1091 Lakeview Ter., Azusa, Calif. 91702

[21] Appl. No.: 367,338

[22] Filed: Jun. 16, 1989

[51] Int. Cl.5 ...................... B01D 61/24; B01D 61/28; B01D 61/30

[52] U.S. Cl. ............................... 210/644; 210/321.68; 210/321.87; 24/30.5 R; 24/543; 366/273

[58] Field of Search ........... 210/644, 645, 646, 321.67, 210/321.68, 321.87; 24/30.5 R, 49 M, 303, 543; 366/273, 274

[56] References Cited

U.S. PATENT DOCUMENTS

| | | | |
|---|---|---|---|
| 2,601,424 | 6/1952 | Baker | 24/49 M |
| 3,097,406 | 7/1963 | Yarborough | 24/303 |
| 3,503,877 | 3/1970 | Berry | 210/644 |
| 3,629,905 | 12/1971 | Cote | 24/30.5 R |
| 3,874,042 | 4/1975 | Eddleman et al. | 251/3 |
| 4,144,165 | 3/1979 | Matz | 210/644 |
| 4,828,706 | 5/1989 | Eddleman | 210/644 |

*Primary Examiner*—W. Gary Jones
*Attorney, Agent, or Firm*—Edgar W. Averill, Jr.

[57] ABSTRACT

An improved process for performing a dialysis operation and the magnetic weighted clamp used therewith. A dialysis sack is closed at one end with a weighted clamp which includes a magnetic bar. The closed sack is placed in a container filled with a dialysis buffer solution. The container is placed on a magnetic stir plate, and the clamp and dialysis sack are turned within the buffer solution so that the buffer at the surface of the dialysis sack is continuously renewed.

5 Claims, 1 Drawing Sheet

U.S. Patent
Oct. 2, 1990
4,960,521
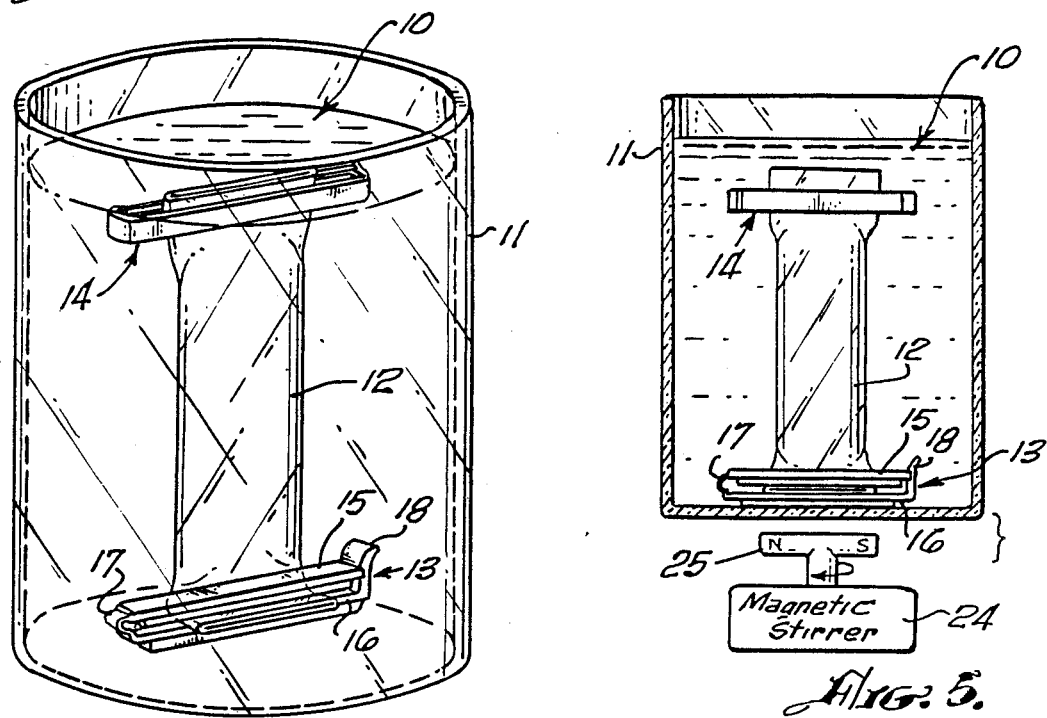
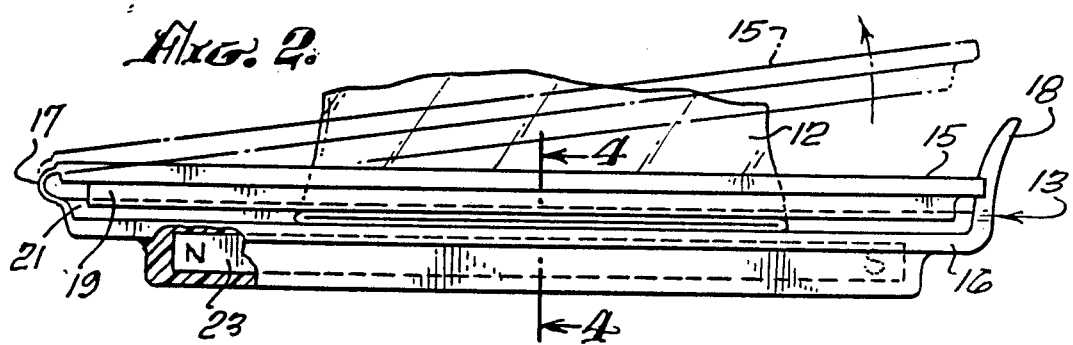
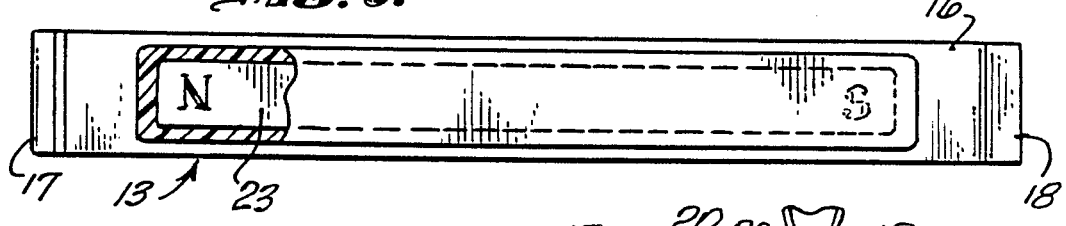
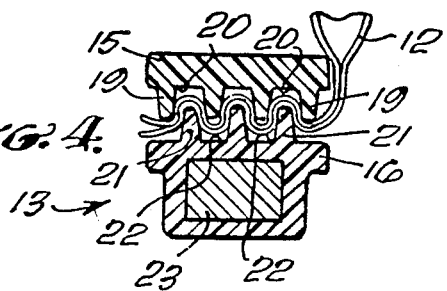

PROCESS FOR PERFORMING A DIALYSIS OPERATION USING A MAGNETIC WEIGHTED CLAMP

CROSS-REFERENCE TO RELATED APPLICATIONS

An application was filed on a weighted clamp for use in performing a dialysis operation and was assigned to the assignee of the present application. This application was filed Mar. 7, 1988, was assigned Ser. No. 164,839, now U.S. Pat. No. 4,828,706, and is entitled PROCESS FOR PERFORMING A DIALYSIS OPERATION.

BACKGROUND OF THE INVENTION

The field of the invention is dialysis procedures, and the invention relates more particularly to dialysis procedures that are carried out in a tubular membrane immersed in a dialysis buffer solution within a container.

The process of dialysis is well known and involves the placing of a sample on one side of a semipermeable membrane and a solvent on the other side of the membrane. Solutes of a small size, which are small enough to pass through the wall of the dialysis membrane, will pass from the sample to the solvent, whereas the larger solutes, or macrosolutes, will not be capable of passing through the dialysis membrane and, thus, will remain in the sample. By such a process, microsolutes, such as salts, may be removed from a sample by dialysis.

Dialysis tubing has been used to carry out this operation and typically one end of the tubing is clamped with a clamp of the type shown in U.S. Pat. No. 3,874,042. This permits the easy filling of a length of tubing, and in the past, various means were used such as the placing of one or more marbles inside the tubing to weight one end thereof. The clamps of the type shown in U.S. Pat. No. 3,874,042 are typically fabricated from polypropylene and are lighter than the dialysis bath and, thus, tend to float therein. It is advantageous to maintain the tubing in a vertical manner, and a weighted clamp has been disclosed in applicant's above-referenced patent which causes the dialysis sack to float in a vertical position. In order to facilitate the dialysis processing, it is advantageous to agitate the dialysis buffer solution so that the liquid layer at the surface of the semipermeable membrane is frequently renewed. This increases the concentration gradient across the membrane and speeds the flow of solutes through the membrane.

In the past, this agitation has typically been carried out by placing a stirrer in the dialysis buffer solution, but with the use of a weighted clamp the stirrer can become entangled with the dialysis tubing.

SUMMARY OF THE INVENTION

It is an object of the present invention to provide a process for facilitating the agitation of a dialysis buffer solution.

It is another object of the present invention to provide a weighted ferromagnetic clamp for use in dialysis operations.

The present invention is for an improved process for performing a dialysis operation of the type including the first step of closing one end of a dialysis sack, the dialysis sack being of the type having one end remaining open after said closing step. The dialysis sack was next filled with the liquid to be treated. A weighted clamp was snapped over the remaining open end of the sack, and the filled dialysis sack was placed into a container of dialysis buffer solution. The weighted clamp was of sufficient density to cause that end of the sack, to which the weighted clamp is affixed, to sink to the bottom of the dialysis buffer solution. The improvement of the present invention comprises a weighted clamp which includes a ferromagnetic bar therein. The container of dialysis buffer solution and dialysis sack is placed on a magnetic stir plate which is then turned causing the filled dialysis sack to turn within the buffer solution. Such turning action continually renews the buffer at the outer surface of the dialysis sack. The present invention also includes the magnetic weighted clamp which comprises a closure having an upper half hinged to a lower half and a clasp means to secure the halves together. The closure is weighted, and the improvement of the present invention comprises a ferromagnetic bar held by the lower half of the closure so that when the closure is affixed to a dialysis sack within a container of dialysis buffer solution, and the container is placed over a magnetic stir plate, the entire clamp and sack assembly is turned within the buffer solution.

BRIEF DESCRIPTION OF THE DRAWINGS

FIG. 1 is a perspective view of a container filled with a dialysis buffer solution containing a dialysis sack closed at the lower end of the magnetic weighted clamp of the present invention.

FIG. 2 is an enlarged side elevation, partly in cross-section, of the ferromagnetic weighted clamp of the present invention.

FIG. 3 is a bottom view of the clamp of FIG. 2.

FIG. 4 is a cross-sectional view taken along line 4—4 of FIG. 2.

FIG. 5 is a side view showing the magnetic stirrer used with the magnetic weighted clamp of the present invention.

DESCRIPTION OF THE PREFERRED EMBODIMENTS

A dialysis bath 10 comprising a dialysis buffer solution is held within a container 11. A length of dialysis tubing 12 is closed at its lower end by magnetic weighted clamp 13 and at its upper end by an unweighted clamp 14. Such clamps are generally of the type disclosed in U.S. Pat. No. 3,874,042.

Magnetic weighted clamp 13 is shown in enlarged side view in FIG. 2 and can be seen to have an upper half 15 and a lower half 16 connected by a living hinge 17. A clasp 18 holds the upper half in a closed configuration with respect to the lower half. The upper half 15 has a series of ridges 19, shown in FIG. 4, which are separated by a series of valleys 20. Similarly, lower half 16 has a series of ridges 21 with valleys 22 therebetween. These ridges and valleys securely grasp the length of tubing 12, as shown in FIG. 4, and prevent any escape of liquid through the opening.

The improvement of the present invention is the use of a combined weighted and ferromagnetic clamp 13 which includes a ferromagnetic bar 23 which is held to the lower half 16 of weighted clamp 13. The bar is shown as being completely imbedded in the lower half 16, although it could also be secured to the lower half in another manner. The magnetic weighted clamp, of course, sinks to the bottom of the dialysis buffer solution 10. When the container is placed over a magnetic stirrer 24, as shown in FIG. 5, which has a rotating ferromagnetic bar 25, the magnetic weighted clamp 13 will thus turn with bar 25 and cause the entire length of tubing 12 and the unweighted clamp to turn with the bar 25. This agitates the solution and continually renews the dialysis buffer solution 10 along the outer surface of the length of dialysis tubing 12. In this way, there is no need for a separate stir bar which then stops any stirring action.

The clamp is preferably fabricated from a polymer such as polypropylene which is inherently lighter than most dialysis buffer solutions. Thus, the unweighted clamp 14 will tend to float in the dialysis buffer solution 10 and cause the assembly to remain in an upright configuration as shown in FIG. 1. Furthermore, the presence of the magnetic stirrer tends to center the assembly near the center of the buffer solution and away from the edge. When the dialysis sack 12 is permitted to rest against the interior edge of container 11, the concentration along the liquid between the sack and the container edge becomes more highly concentrated, and the concentration gradient across the membrane is reduced. Thus, the centering action caused by the combined rotating ferromagnetic bar 25 and the ferromagnetic bar 23 also provides this important centering function.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved process for performing a dialysis operation of the type including the steps of:
    closing one end of a dialysis sack, said dialysis sack being of the type having one end remaining open after said closing step;
    filling the dialysis sack with a liquid to be treated;
    snapping a weighted clamp over said one end remaining open and placing said filled dialysis sack into a container of dialysis buffer solution, said weighted clamp being of sufficient density to cause the weighted clamp to rest on the bottom of said container of dialysis buffer solution, wherein the improvement comprises:
    using a weighted clamp which includes a ferromagnetic bar; and
    placing said container of dialysis buffer solution on a magnetic stir plate including a stir bar whereby when said magnetic stir bar in said stir plate is rotated, the dialysis sack is turned within the dialysis buffer solution and the buffer at the surface of the dialysis sack is repeatedly renewed.

2. An improved closure clasped about a portion of a dialysis sack, said closure being of the type which has an upper half hinged to a lower half and clasp means to secure the halves together and said closure being a weighted closure so that the closure will sink in a dialysis buffer solution, wherein the improvement comprises:
    a dialysis sack having said improved closure clasped about a portion thereof;
    a ferromagnetic bar held by the lower half of said closure whereby when said closure and said dialysis sack are immersed in a dialysis buffer solution in a container and the container is placed over a magnetic stirrer, the dialysis sack will turn with the magnetic stirrer and continually renew the buffer at the surface of the dialysis sack.

3. The improved closure of claim 2 wherein said ferromagnetic bar is imbedded in the lower half of said closure.

4. The improved closure of claim 3 wherein said weighted closure is fabricated from polypropylene and the weight which causes the closure to sink in a dialysis buffer solution is said ferromagnetic bar and wherein said ferromagnetic bar is an elongated ferromagnetic bar.

5. An improved closure for a dialysis sack, said closure being of the type which has an upper half hinged to a lower half and clasp means to secure the halves together, and said closure being a weighted closure so that the closure will sink in a dialysis buffer solution and wherein said weighted closure is fabricated from polypropylene, wherein the improvement comprises:
    an elongated ferromagnetic bar held by the lower half of said closure, said ferromagnetic bar being of a greater density than the dialysis buffer solution into which it is immersed whereby when said closure is affixed to a dialysis sack and immersed in a dialysis buffer solution in a container and the container is placed over a magnetic stirrer, the dialysis sack will sink to the bottom of the dialysis buffer solution and will turn with the magnetic stirrer and continually renew the buffer at the surface of the dialysis sack.

* * * * *